United States Patent
Tao et al.

(10) Patent No.: US 11,359,094 B2
(45) Date of Patent: Jun. 14, 2022

(54) SILICONE COMPOSITE FOR HIGH TEMPERATURE APPLICATIONS

(71) Applicants: TE Connectivity Services GmbH, Schaffhausen (CH); TE Connectivity Germany GmbH, Bensheim (DE)

(72) Inventors: Dejie Tao, Fremont, CA (US); Lei Wang, San Jose, CA (US); Yiliang Wu, San Ramon, CA (US); Ting Gao, Palo Alto, CA (US); Andre Martin Dressel, Lampertheim (DE); Marco Wolf, Hochstadt (DE); Mei Dong, College Station, TX (US)

(73) Assignees: TE CONNECTIVITY SERVICES GMBH, Schaffhausen (CH); TE CONNECTIVITY GERMANY GMBH, Bensheim (DE)

( * ) Notice: Subject to any disclaimer, the term of this patent is extended or adjusted under 35 U.S.C. 154(b) by 135 days.

(21) Appl. No.: 16/736,947

(22) Filed: Jan. 8, 2020

(65) Prior Publication Data

US 2021/0206971 A1 Jul. 8, 2021

(51) Int. Cl.
| | |
|---|---|
| B32B 15/08 | (2006.01) |
| B32B 27/28 | (2006.01) |
| C08L 83/04 | (2006.01) |
| B32B 27/08 | (2006.01) |
| C08K 3/36 | (2006.01) |
| C08K 3/22 | (2006.01) |
| C08K 3/26 | (2006.01) |
| H01M 50/143 | (2021.01) |
| H01M 50/24 | (2021.01) |

(52) U.S. Cl.
CPC ............. *C08L 83/04* (2013.01); *B32B 15/08* (2013.01); *B32B 27/08* (2013.01); *B32B 27/283* (2013.01); *B32B 2307/206* (2013.01); *C08K 3/36* (2013.01); *C08K 2003/2206* (2013.01); *C08K 2003/2224* (2013.01); *C08K 2003/2227* (2013.01); *C08K 2003/267* (2013.01); *H01M 50/143* (2021.01); *H01M 50/24* (2021.01)

(58) Field of Classification Search
CPC ....................................................... B32B 15/08
See application file for complete search history.

(56) References Cited

U.S. PATENT DOCUMENTS

| | | | | |
|---|---|---|---|---|
| 3,634,136 | A * | 1/1972 | French | C09D 5/18 428/447 |
| 6,043,309 | A * | 3/2000 | Nakamura | C08K 5/5419 524/106 |
| 2006/0084744 | A1* | 4/2006 | Kuhn | C08L 83/04 524/492 |
| 2011/0250475 | A1 | 10/2011 | Yamamoto et al. | |
| 2012/0183819 | A1 | 7/2012 | Yamamoto et al. | |
| 2013/0266799 | A1* | 10/2013 | Megu | C08K 5/11 428/328 |
| 2019/0233612 | A1* | 8/2019 | Endo | C08K 7/00 |
| 2020/0123427 | A1* | 4/2020 | Endo | C09D 7/61 |
| 2020/0388551 | A1* | 12/2020 | Ashiba | B32B 27/20 |

FOREIGN PATENT DOCUMENTS

| | | |
|---|---|---|
| CN | 107591759 | 1/2018 |
| EP | 0708455 A1 | 4/1996 |
| WO | 2010097705 A1 | 9/2010 |
| WO | WO 2018/025600 A1 * | 2/2018 |

OTHER PUBLICATIONS

Siska Hamdani-Devarennes, et al. Calcium and aluminium-based fillers as flame-retardant additives in silicone matrices II. Analyses on composite residues from an industrial-based pyrolysis test; Polymer Degradation and Stability 96 (2011) pp. 1562-1572; journal homepage:www.elsevier.com/locate/polydegstab.
European Search Report for EP 21 15 0208 dated Oct. 5, 2021.

* cited by examiner

*Primary Examiner* — Marc S Zimmer

(57) ABSTRACT

A silicone composite for high temperature insulation applications is disclosed. The composite is formed of a silicone and a thermally decomposable inorganic filler which are compounded together. The compounded material is then injection molded, overmolded, compression molded, cast, laminated, extruded, or dispensed. When the silicone composite is exposed to a high temperature, it forms an inorganic composite and maintains its insulating properties and dimensional stability.

11 Claims, 7 Drawing Sheets

FIGURE 13
Fig. 13A
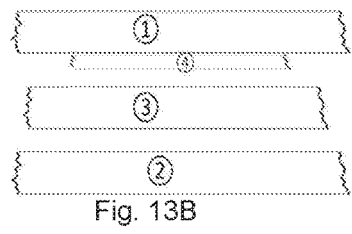
Fig. 13B
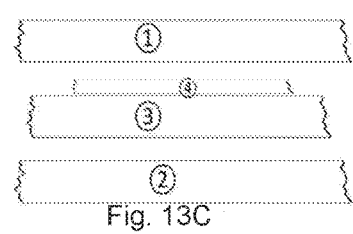
Fig. 13C
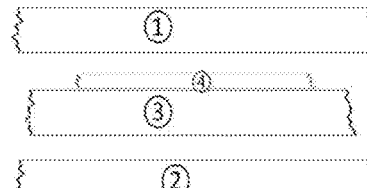
Fig. 13D
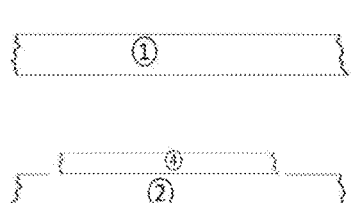
Fig. 13E
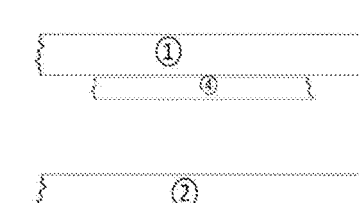
Fig. 13F
①, ② Metal Part   ③ Polymeric Layer   ④ Insulation Layer

SILICONE COMPOSITE FOR HIGH TEMPERATURE APPLICATIONS

FIELD OF THE INVENTION

The present invention is directed to a silicone composite comprising a silicone and an inorganic filler wherein when the silicone composite is exposed to a high temperature, the silicone composite forms at least a portion of an inorganic composite and maintains its dimensional stability.

BACKGROUND OF THE INVENTION

There are many applications that require insulation that can withstand high temperatures. Ceramic or glass materials are commonly used as high temperature insulation materials. Ceramic or glass materials are also relatively rigid and hard and cannot easily be used in many applications due to their rigidity and hardness. These materials are relatively brittle and cannot be used in applications in which there are vibratory forces. Furthermore, these ceramic or glass materials have higher manufacturing costs than other materials.

Plastic materials consist of a wide range of synthetic or semi-synthetic organic compounds. Plastic materials are generally malleable and can easily be molded into solid objects. Plastics generally have good insulative properties at low temperatures, generally less than 300° C., and cannot be used as insulating materials at high temperatures. Plastic materials generally cost less to manufacture than ceramic or glass materials.

Silicone composites have been used in a wide variety of fields as insulating materials because of their physical and electrical properties. It is known that electric wires and cables covered with silicone rubber or silicone composites have improved physical strength as well as improved electrical insulation properties. However, these wire or cable coverings of silicone rubber or silicone composites burn away when they are exposed to high temperatures above 500° C. which results in a decrease or loss of electrical insulating performance as well as mechanical stability. Therefore, these silicone composites are not suitable for high temperature applications in which the composites should maintain their shapes, have sufficient strength, and remain electrically insulative.

U.S. Pat. No. 4,269,753 (Mine et al.) describes a siloxane composition which can be converted to an elastomer or resin at normal curing temperatures but will ceramify upon firing to higher temperatures to give flexible ceramics having electrical insulating properties and excellent physical properties. The composition consists essentially of (a) 100 parts by weight of a siloxane copolymer consisting essentially of $R_3SiO_{1/2}$ units wherein R is a monovalent organic radical having 1-10 carbon atoms and containing at least two unsaturated groups and at least two alkoxy groups bound to silicon atoms per molecule, (b) 0-600 parts by weight of a linear or branched organopolysiloxane polymer having at least two unsaturated groups bound to silicon atoms per molecule, (c) an organopolysiloxane having at least two hydrogen atoms bonded to silicon atoms per molecule, (d) 3-300 parts by weight of a ceramic forming filler substance, and (e) a catalytic amount of an addition reaction catalyst wherein in components (a), (b) and (c) the mole ratio of hydrogen atoms bound to silicon atoms to unsaturated groups bound to silicon is from 0.5/1 to 10/1 and the total number of unsaturated groups in component (a) and component (b) and the total number of hydrogen atoms bonded to silicon atoms in component (c) is at least 5. When a solid substrate is coated with this composition, and heated to 500° C. or higher, it forms a ceramic. The ceramic forming filler substance is not thermally decomposable.

The article, "Investigation of Ceramifying Process of Modified Silicone-Silicate Compositions", J Mater Sci, 42 (15), 6046-6055, August 2007, describes the addition of glass frits to silicone based composites to improve low temperature ceramification at elevated temperatures. The article concludes that glass frits melt at a temperature below the mica-silica eutectic temperature and combine with the inorganic fillers and pyrolysis products of silicone rubber to assist the formation of a ceramic. Glass frits react with the filler and silica matrix to form a liquid intermediate phase which bonds the fillers and silica matrix together rendering strength to the char.

International Publication Number WO2010/097705 A1 (Nexans) describes a fire performance material and cable including the material. The publication describes a fire performance material comprising a polymer including a silicone polymer, and a calcium carbonate filler, characterized in that the calcium carbonate filler is present in the material in an amount to leave post-combustion residue after exposure of such material to fire, the material including less than 50 parts by weight of ceramizable filler to 100 parts by weight of polymer. The calcium carbonate has a high decomposition temperature of about 840° C. The mixture decomposes on exposure to fire to provide a protective layer.

The article, "The Thermal Stabilisation and Ceramifying of Silicone Rubbers", International Polymer Science and Technology, 43 (4), T33-T40, April 2016, discusses the need to find additives, fillers and catalysts that substantially increase the service life of siloxane elastomer composites at temperatures above 300° C. or that promote the formation of ceramic-like materials using a combustion process. Silicone rubbers possess high heat resistance and do not release toxic products on thermal degradation or combustion. Additives, fillers, and catalysts are added to the silicone rubbers which are then processed on conventional extrusion equipment to form sheets, profiles or coatings. Under conditions of fire, a refractory of ceramic can be formed by the composite. Many of these composites use platinum as an additive to increase the flame resistance. The article also describes a method for the manufacture of a cable with a ceramifying silicon sheath based on a silicone elastomer, calcium carbonate and an additional glass-forming filler. When exposed to a flame, the sheath decomposes providing a protective or electrical insulation layer on the lead.

It would, therefore, be beneficial to provide a silicone composite that could be used for high temperature applications. Preferably, it would be beneficial to provide a silicone composite that could maintain its insulation properties with good dimensional stability under 500° C. for about at least 15 minutes and 1200° C. for about at least 10 seconds, or under 500° C. for about at least 30 minutes and 1200° C. for at least 10 seconds. Most preferably, it would be beneficial to provide a silicone composite that could maintain its insulation properties with good dimensional stability without the use of a combustion process to form said composite. Furthermore, it would be beneficial to provide a method for forming a silicone composite which can be used for high temperature applications as well as an article formed of such a silicone composite.

SUMMARY OF THE INVENTION

An embodiment is directed to a silicone composite having a thermally decomposable inorganic filler that can be processed and which can be used for high temperature insulation applications, whereby when the silicone composite is exposed to high temperatures it forms at least a portion of an inorganic composite, while maintaining its strength and shape, with shrinkage of no more than 25%.

An embodiment is directed to an apparatus comprising a first metal part, a second metal part, an optional polymeric layer, and an insulative layer, wherein the first and the second metal parts are separated from each other with the polymeric layer and/or insulative layer between the first and the second metal layers, and the insulative layer is spatially between the polymer layer and one of the metal parts or between two metal parts, wherein said insulative layer is a silicone composite comprising a silicone and an inorganic filler which can be decomposed at a temperature of 500° C. or less.

An embodiment is directed to a connector, a circuit protection device, a relay device, a battery package, a power distribution unit or a battery disconnection unit, which comprises a first metal part, a second metal part, an optional polymeric layer, and an insulative layer, wherein the first and the second metal parts are separated from each other with the polymeric layer spatially between the first and the second metal parts, and the insulative layer is spatially between the polymer layer and one of the metal parts or between the two metal parts, wherein said insulative layer is a silicone composite comprising a silicone and an inorganic filler which can be decomposed at a temperature of 500° C. or less.

Other features and advantages of the present invention will be apparent from the following more detailed in conjunction with the accompanying drawings which illustrate, by way of example, the principles of the invention.

BRIEF DESCRIPTION OF THE DRAWINGS

FIGS. 13(A), 13(B), 13(C), 13(D), 13(E) and 13 (F) show a diagrammatic view of possible configurations of layers of metals, polymers and insulative layers used to form an apparatus according to the instant invention.

DETAILED DESCRIPTION OF THE INVENTION

Figure 1:
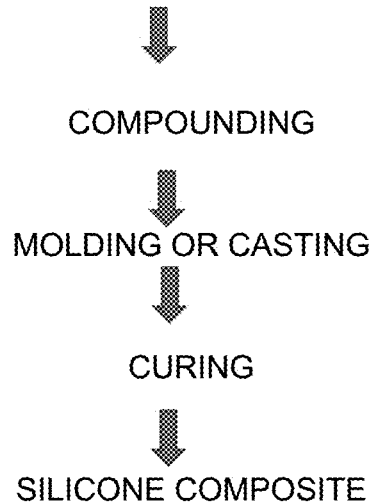
FIG. 1 is a flow-chart showing the steps used to form a silicone composite.
Figure 2:
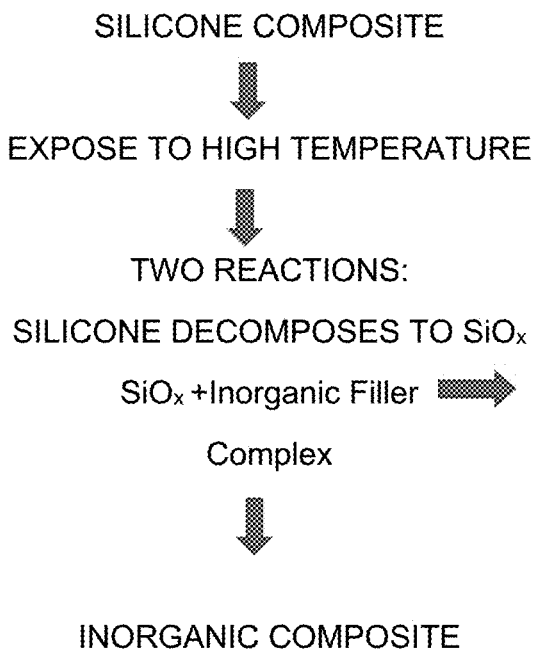
FIG. 2 is a flow-chart showing the process whereby the silicone composite is converted into an inorganic composite which can withstand high temperatures while maintaining its strength and dimensional stability.

The description of illustrative embodiments according to principles of the present invention is intended to be read in connection with the accompanying drawings, which are to be considered part of the entire written description. In the description of embodiments of the invention disclosed herein, any reference to direction or orientation is merely intended for convenience of description and is not intended in any way to limit the scope of the present invention. Relative terms such as "lower," "upper," "horizontal," "vertical," "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation unless explicitly indicated as such. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise.

Moreover, the features and benefits of the invention are illustrated by reference to the preferred embodiments. Accordingly, the invention expressly should not be limited to such embodiments illustrating some possible non-limiting combination of features that may exist alone or in other combinations of features, the scope of the invention being defined by the claims appended hereto.

A new insulation material is provided which is able to maintain its insulating properties with good dimensional stability at 450° C., 500° C. or 650° C. for at least 5 minutes, 10 minutes, 15 minutes, 30 minutes or 60 minutes and at 1100° C., 1200° C. or 1300° C. for at least 5 seconds, 10 seconds, 20 seconds, 30 seconds or 60 seconds. The new insulation material is able to provide similar insulation performance as plastics, glass, and ceramics. In one embodiment, this new insulation material is flexible with a hardness not higher than shore D 90 including not higher than shore D 70, not higher than shore D 50, moldable and easier to manufacture than ceramics or glass, at a much lower cost. The insulation material can be molded, cast, laminated, extruded or dispensed into different shapes depending upon its end use application. Furthermore, this new insulation material has the combined properties of plastic and ceramic or glass. The novel insulation material is more flexible than most plastics due to the intrinsic properties of silicone and it maintains its shape and strength as a ceramic, after being exposed to high temperatures. The novel insulation layer is formed from a silicone composite.

This novel silicone composite is formed from a silicone polymer and an inorganic filler. This novel silicone composite when exposed to a high temperature converts the silicone composite into at least a portion of an inorganic composite and can be used as an insulation material in applications which require a stable insulating material. In some embodiments, the silicone composite can convert into at least a portion of an inorganic composite at a temperature of 500° C. and above. In other embodiments, the silicone composite can convert into at least a portion of an inorganic composite at a temperature of no more than 500° C., for example, at a temperature from about 350° C. to less than 500° C., including a temperature from 400° C. to less than 500° C. Such low temperature converted inorganic composite will help the silicone composite maintain a good dimensional stability at a very broad temperature range from about 500° C. to about 1300° C. In a specific embodiment, the conversion is done by heating the composite. There is no flame, fire, or other combustion process used. In this embodiment, the conversion process also does not have a liquid intermediate state. This is very important for some applications in which a pressure will be applied on the insulating silicone composite as discussed hereinafter. In specific embodiments, the silicone composite is free of glass frits.

The silicone used in the silicone composite can be any silicone elastomer or polymer containing a chain made of alternating silicon and oxygen atoms. It can be a liquid silicone rubber (LSR), high consistency rubber (HCR), fluorosilicone, polyhedral oligomeric silsesquioxane (POSS), silicone polyamide, silicone polyurethane, silicone epoxy and other silicones. Examples of a suitable silicone are LSR 2660 and LSR7060 from GE Silicones. The type of silicone used is dependent upon the final end application. The silicone used in the silicone composite can also contain other additives, dependent upon the final desired end use. Examples of suitable additives include fumed silica, antioxidants, flux or catalysts. Suitable antioxidants include phenol antioxidants or amine antioxidants. Examples of suitable fluxes include $NH_4F$, $NH_4Cl$, and $Na_2B_4O_7$. Possible catalysts that can be used include peroxide or platinum catalysts.

The silicone is then compounded with an inorganic filler. Any known mixing device can be used to compound the silicone with the inorganic filler to form a homogenous mixture. Examples of mixing devices include a FlackTek Speed Mixer, a Ross mixer, a kneader mixer, a two-roll mixer, a three-roll mill, or any other device which can compound the two materials.

The inorganic filler used in the instant invention can be any inorganic filler. Preferably, the inorganic filler can be decomposed at a temperature of 500° C. or below. Examples of possible inorganic fillers which can be used include, but are not limited to, magnesium hydroxide, magnesium carbonate, calcium hydroxide, sodium bicarbonate, potassium bicarbonate, aluminum hydroxide, and mixtures thereof. The inorganic filler comprises from about 10 wt. % to about 90 wt. % of the silicone composite, preferably about 30 wt. % to about 90 wt. %, or about 50 wt. % to about 85 wt. %. Most preferably, magnesium hydroxide and aluminum hydroxide are used due to their flame retardant properties. In one embodiment, at least 30% by weight of magnesium hydroxide or aluminum hydroxide is preferably used to achieve the desired result. The inorganic fillers preferably have a particle size of 20 microns or smaller, 10 microns or smaller, more preferably, 5 microns or smaller and most preferably 3 microns or smaller. Specifically, for magnesium hydroxide, the particle size is 10 microns or smaller, more preferably, 5 microns or smaller and most preferably 3 microns or smaller.

Once the silicone and the inorganic filler are compounded, they are processed into a processed composition with the desired shape. Any conventional molding, casting, laminating, extruding, or dispensing process can be used to achieve the desired shape of the processed composition. Examples of suitable molding processes include injection molding, overmolding, or compression molding. In some embodiments, the compounded silicone and inorganic filler are dispensed into the desired shape.

The processed composition is then cured to result in a silicone composite. Curing can occur at room temperature, although it is preferable to cure the composition at a temperature range from about 50-200° C. The type of curing used, as well as the curing conditions, are dependent upon the type of silicone that is used. For example, the silicone composite can be cured by moisture, ultraviolet light, or by exposing the composite to a high temperature.

The silicone composite can be used in a variety of applications. The silicone composite is flexible and moldable. The silicone composite formed according to the instant invention, when exposed to high temperature up to 1300° C., maintains its shape, strength and dimensional stability with a shrinkage of no more than 25%, including a shrinkage of no more than 20%, or no more than 15%. It is desired that there is an expansion rather than a shrinkage. In this invention, expansion in any dimension is not considered a dimensional stability change. The silicone composite retains its shape under a load of $5 \times 10^4$ N/square meter, including no more than $1 \times 10^4$ N/square or no more than $1 \times 10^3$ N/square at a temperature of greater than 500° C. Once the silicone composite is exposed to high temperatures, without limitation to any theory, it is believed that two additional reactions occur. First, the silicone in the silicone composite is reduced to silicon oxide ($SiO_x$). This silicone oxide then reacts with the inorganic filler or its decomposed components and thereby forms an inorganic composite. This inorganic composite has excellent dimensional stability, strength and insulating properties.

Another aspect of this invention is an apparatus formed using the silicone composite. In one embodiment, the apparatus comprises a first metal part, a second metal part, an optional polymeric layer and an insulation layer comprising the silicone composite of the instant invention. The polymeric layer can be any polymeric layer which can be formed into the desired shape and thickness. The polymeric layer can be chosen from the group comprising polybutylene terephthalate (PBT), nylon, polyethylene terephthalate (PET), polyphenylene sulfide (PPS), polyetherimide (PEI), polyether ether ketone (PEEK), polycarbonate (PC), and acrylonitrile butadiene styrene (ABS). The first and the second metal parts are separated from each other. The polymeric layer is located spatially between the first and the second metal parts. The insulation layer can be between the polymeric layer and at least one of the metal parts or between the two metal parts in case that there is no polymeric layer. Alternatively, an air gap can be placed between the two metal layers and the insulation layer.

FIGS. 13(A), 13(B), 13(C), 13(D), 13 (E) and 13(F) are diagrammatic views of various embodiments of an apparatus formed of a silicone composite. As can be seen with the various embodiments, 1 and 2 are metal parts, 3 is a polymeric layer, and 4 is the insulation layer. FIG. 13(A) shows a polymeric layer between two metal layers with the insulation layer on the bottom metal. FIG. 13(B) shows a polymeric layer between two metal parts with the insulation layer on the top metal part. FIG. 13(C) shows two metal parts with a polymeric layer between and the insulation on top of the polymeric layer. FIG. 13(D) shows two metal parts with the insulation layer on top of the polymeric layer. It should be noted that the parts and layers do not need to be in contact with each other. In other words, air gaps can exist in between the parts or layers, as shown for example in FIG. 13(E) which has two metal parts and an insulation layer on the lower metal part. FIG. 13(F) has two metal parts with an air gap between with insulation on the top metal part. Alternate embodiments are possible, provided that the embodiments include the silicone composite described herein. The metal layers can be made of any suitable metals. Examples of suitable metals include copper, copper alloy, aluminum or an aluminum alloy. The insulation layer of the apparatus is a silicone composite. The insulation layer of this apparatus has a thickness, for example, of less than 5 mm, including less than 2 mm, including less than 1 mm. The silicone composite comprises a silicone and an inorganic filler which can be decomposed at a temperature of 500° C. or less. When the insulation layer is exposed to a high temperature, the silicone composite forms at least a portion of an inorganic composite having good dimensional stability. The apparatus can be a connector, a circuit protection device, a relay device, or a battery package, for example. Any other type of apparatus having the desired qualities can be made from this silicone composite.

The silicone composite can be used in any application where mechanical strength and electrical insulation are demanded where the silicone composite is exposed to high temperatures. The size of the composite is dependent upon the end use application. Furthermore, the processing conditions are also dependent upon the end use of the composite. For example, silicone composite of the instant invention can be used in a traction battery to insulate the aluminum busbar that is used for cell connection. Without insulation, it is possible that if one cell generates excessive heat, other cells or the complete battery assembly may be set off. As a result, the soft and low melting aluminum busbar will be deformed, and a short circuit may be possible. Using the silicone composite of the instant invention as an insulating material for the aluminum busbar will protect the circuit from shorting and even catching on fire.

EXAMPLES

Figure 3:
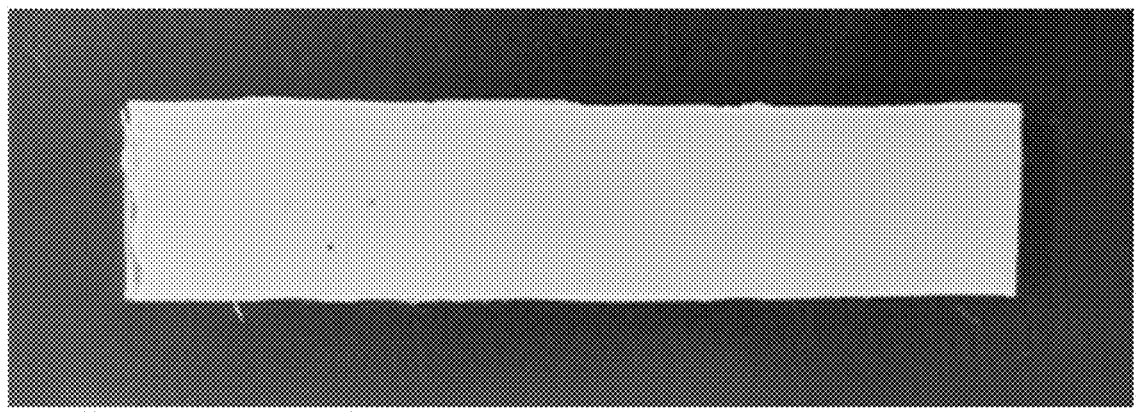
FIG. 3 is a photograph of a molded sample of a silicone composite containing an inorganic filler.
Figure 4:
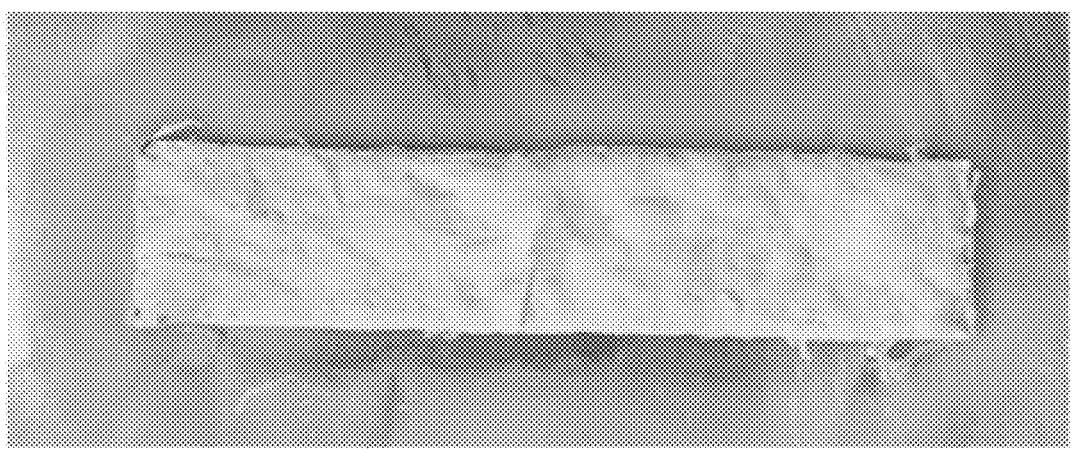
FIG. 4 is a photograph of a molded sample of a silicone composite containing an inorganic filler which is subjected to a high temperature for thirty minutes without a load.
Figure 5:
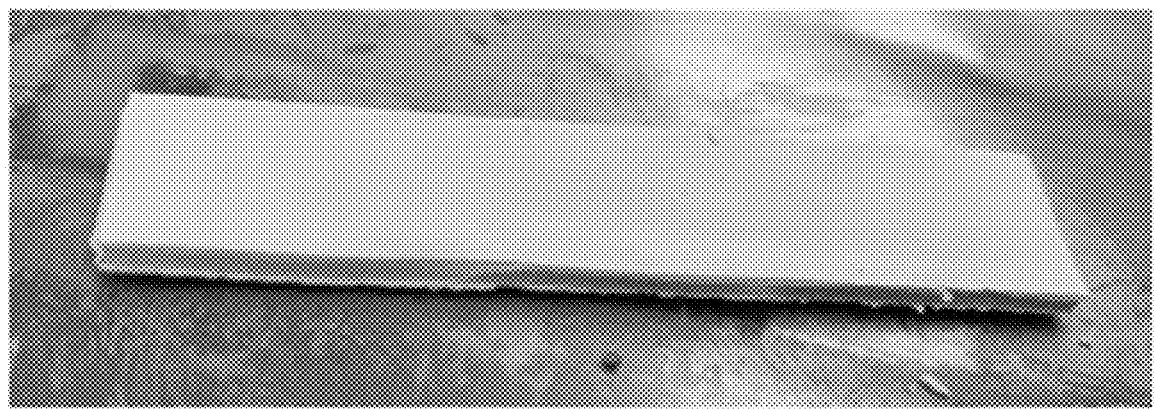
FIG. 5 is a photograph of a molded sample of a silicone composite containing an inorganic filler which is subjected to a high temperature for thirty minutes with a load.
Figure 6:
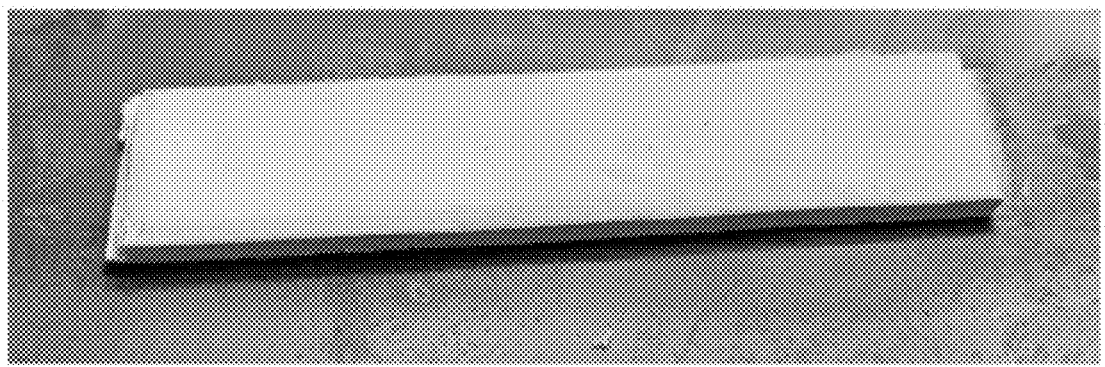
FIG. 6 is a photograph of a molded sample of a silicone composite containing an inorganic filler which is subjected to a high temperature for sixty minutes with a load.

In this example, LSR 2660 silicone rubber was mixed on a FlackTek Speed Mixer DAC 150.1 FVZ centrifugal mixer with magnesium hydroxide to form a silicone composite having 50% by weight of magnesium hydroxide. After mixing, the paste was compression molded to the desired thickness. The product was then cured at 180° C. for thirty minutes to form a silicone composite. FIG. 3 is a photograph of a sample molded from the silicone composite. FIG. 4 shows the sample after being in a 500° C. oven for 30 minutes without a load. FIG. 5 shows a sample of the composite after 30 minutes at a 500° C. in an oven under a load of 3700 Pa. FIG. 6 shows the same sample as in FIG. 3 after a total of 60 minutes under load in a 500° C. oven. These FIGS. 3-6 show that a sample of the silicone composite can be exposed to 500° C. for 30 to 60 minutes and still maintain its original shape, with or without a load. This example illustrates that the silicone composite of the instant invention formed an inorganic composite when exposed to a high temperature and can be used for high temperature applications both with and without a load.

Figure 7:
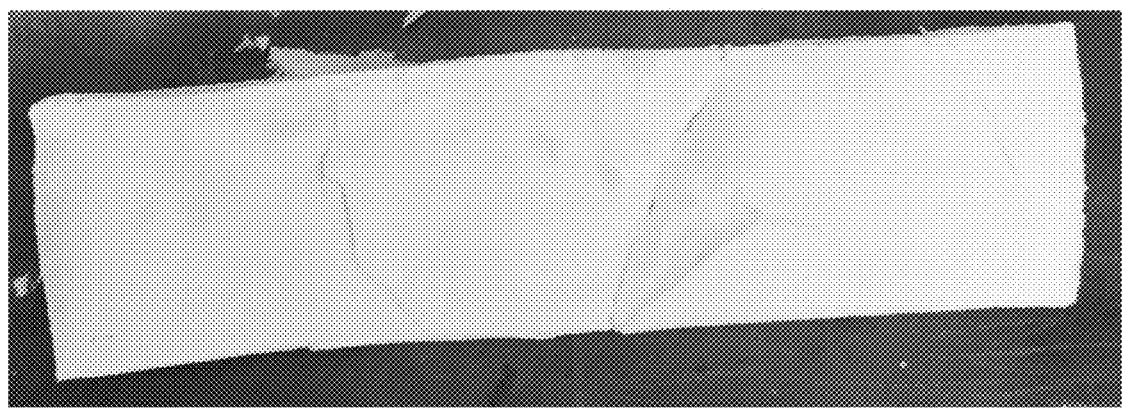
FIG. 7 is a photograph of a molded sample of a silicone composite containing an inorganic filler which is subjected to 1200° C. for one minute without a load.

In another example, LSR 2660 silicone rubber was mixed on a FlackTek Speed Mixer DAC 150.1 FVZ centrifugal mixer with magnesium hydroxide to form a silicone composite having 50% by weight of magnesium hydroxide. After mixing, the paste was compression molded to the desired thickness. The product was then cured at 180° C. for thirty minutes to form a silicone composite. FIG. 7 shows a sample of the composite after 15 minutes at 500° C. in a furnace first and then fired at a 1200° C. furnace for one minute. This example illustrates that the silicone composite of the instant invention formed an inorganic composite when exposed to a high temperature and can be used for high temperature applications both with and without a load.

Figure 8:
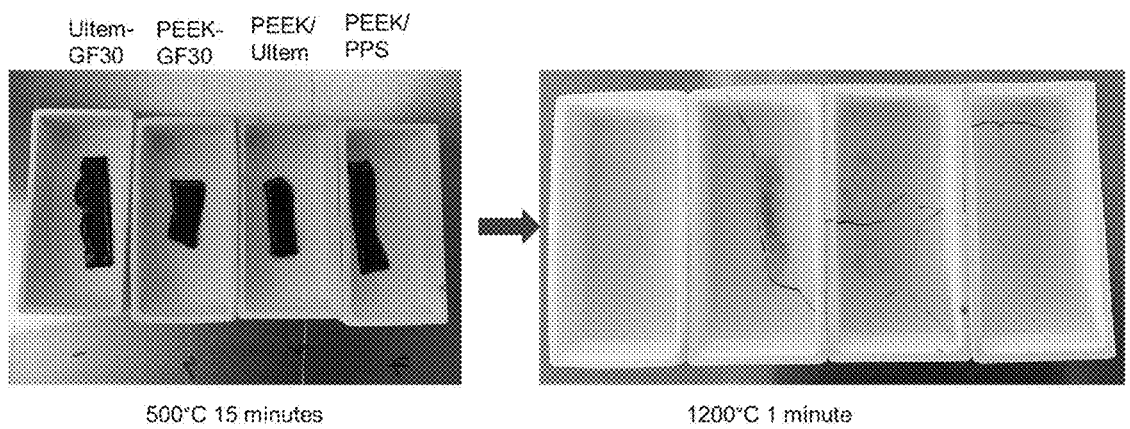
FIG. 8 is a photograph of a comparative molded sample of high temperature resistant polymeric materials which is subjected to 1200° C. for one minute without a load.

In a comparative example, a series of high temperature resistant polymeric materials, Ultem® 2300 polyetherimide from Sabic, Vitrex® PEEK 450GL30 from Vitrex, PEEK/Ultem blends (70 wt. %/30 wt. %) and PEEK/PPS (Fortron® polyphenylene sulfide SF3001 from Celanese) (70 wt. %/30 wt. %) blends were injection molded to the desired dimension of 50 mm by 10 mm by 1 mm. FIG. 8 shows a photograph of the molded high temperature resisted polymeric materials after 15 minutes at 500° C. in a furnace first and then fired in a 1200° C. furnace for one minute. These materials totally burned away after being exposed to 1200° C. for one minute. These comparative examples clearly show that even high temperature resistant polymeric materials do not achieve the same results as achieved with the composite of the instant invention.

Figure 9:
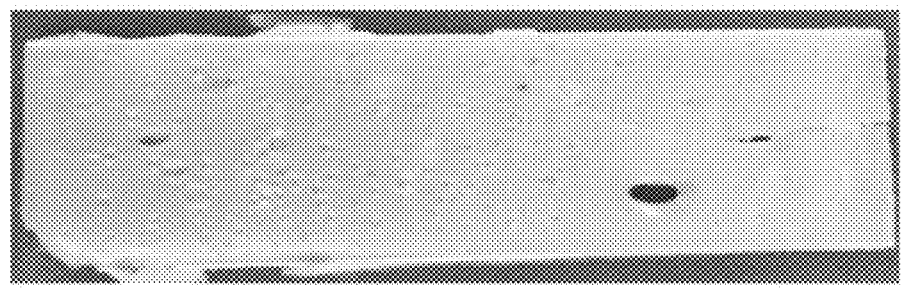
FIG. 9 is a photograph of a comparative molded sample of an epoxy composite containing an inorganic filler.
Figure 10:
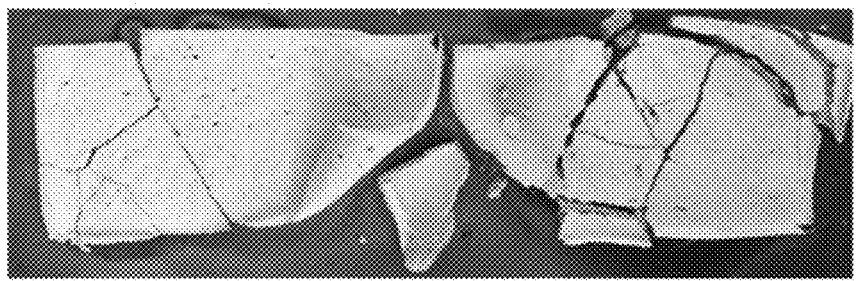
FIG. 10 is a photograph of a comparative molded sample of an epoxy composite subjected to high temperatures and a load for thirty minutes.

In this comparative example, an epoxy, EPO-TEK® 337 from Epoxy Technology, Inc., was mixed with magnesium hydroxide to result in a composite composition having 50% by weight of magnesium hydroxide. The epoxy composite was molded and cured at 150° C. for 60 minutes FIG. 9 shows a photograph of the molded epoxy composite. The epoxy composite was exposed to 500° C. in an oven for thirty minutes, without a load. The epoxy composite crumbled into an inorganic powder. The result of the epoxy sample at the high temperature without a load is shown in FIG. 10. As seen in FIG. 10, the epoxy composite lost its shape and strength. This comparative example shows that an epoxy loaded with an inorganic filler does not result in the same properties as achieved with the silicone composite of the instant invention.

Figure 11:
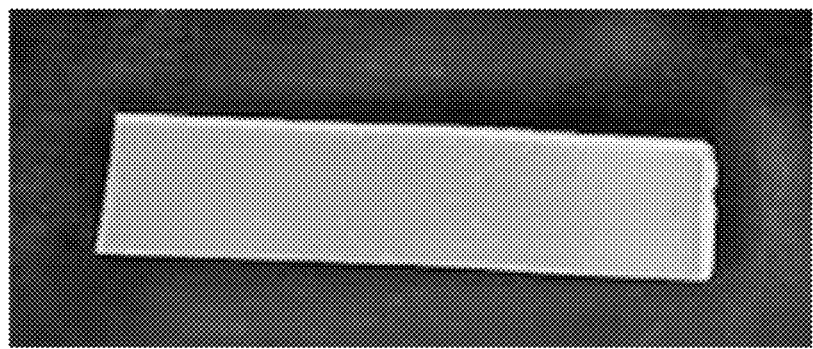
FIG. 11 is a photograph of a comparative molded sample of a polyolefin composite containing an inorganic filler.
Figure 12:
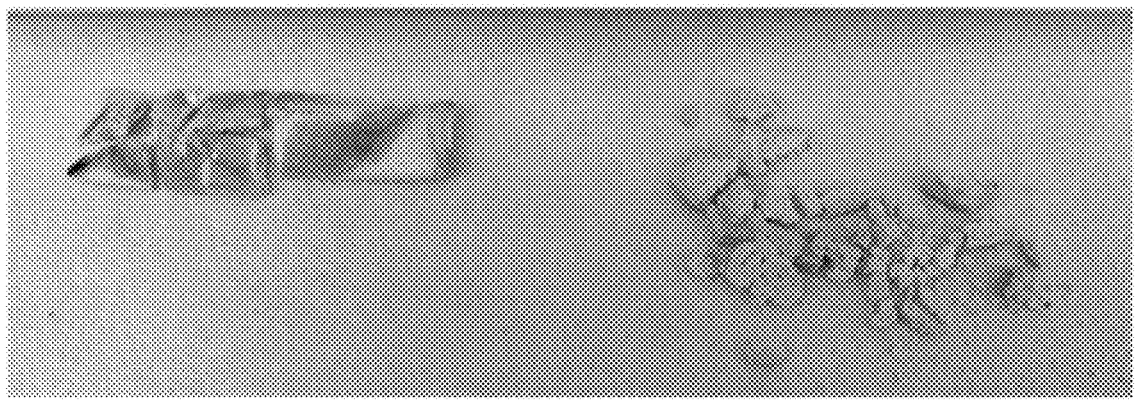
FIG. 12 is a photograph of a comparative molded sample of a polyolefin containing an inorganic filler subjected to high temperatures both with a load and without a load.

In this third example, a grade of low-density polyethylene, SP 1540 from Prime Polymer Co, Ltd. was compounded with the inorganic filler, magnesium hydroxide. The polyolefin composite included 70% by weight of the magnesium hydroxide and was compounded with a Brabender mixer at 120° C. for 30 minutes. The composite was compression molded at 120° C. into two samples. FIG. 11 is a photograph showing a sample of the molded polyethylene composite. Two samples of this polyethylene composite were then placed in a 500° C. oven for thirty minutes, one sample with a load of approximately 1000 Pa. and the other sample without a load. FIG. 12 shows that both with a load and without a load, the polyethylene composite disintegrated into ashes at high temperatures. This comparative example shows that at polyolefin loaded with an inorganic filler does not result in the same properties as achieved with the silicone composite of the instant invention.

While the invention has been described with reference to a preferred embodiment, it will be understood by those skilled in the art that various changes may be made and equivalents may be substituted for elements thereof without departing from the spirit and scope of the invention as defined in the accompanying claims. One skilled in the art will appreciate that the invention may be used with many modifications of structure, arrangement, proportions, sizes, materials and components and otherwise used in the practice of the invention, which are particularly adapted to specific environments and operative requirements without departing from the principles of the present invention. The presently disclosed embodiments are therefore to be considered in all respects as illustrative and not restrictive, the scope of the invention being defined by the appended claims, and not limited to the foregoing description or embodiments.

The invention claimed is:

1. An apparatus comprising: a first metal layer, a second metal layer, a polymeric layer, and an insulation layer, wherein the first and the second metal parts are separated from each other, and the polymeric layer is spatially in between the first and the second layer, and the insulation layer is spatially in between the polymer layer and one of the metal parts, wherein the insulation layer is a silicone composite comprising a silicone and an inorganic filler which is decomposable at a temperature no more than 500° C. and when said silicone composite is exposed to a high temperature it forms an inorganic composite having good dimensional stability, wherein said apparatus is a portion of a connector, circuit protection device, a relay device or a battery package.

2. The apparatus of claim 1 wherein the insulation layer when exposed to a temperature greater than 500° C. remains insulative and retains its shape under a load.

3. The apparatus of claim 1, wherein the insulation layer remains insulative and retains its shape when exposed at a temperature of 500° C. for at least 15 minutes.

4. The apparatus of claim 1, wherein the insulation layer remains insulative and retains its shape when exposed to a temperature of 1200° C. for at least 10 seconds.

5. The apparatus of claim 1, wherein the insulation layer is directly over molded, cast, laminated, inserted or dispensed on the polymer layer.

6. The apparatus of claim 1, wherein the insulation layer when exposed to high temperature maintains its dimensional stability with shrinkage of no more than 25%.

7. The apparatus of claim 1, wherein the inorganic filler is chosen from the group comprising: magnesium hydroxide, magnesium carbonate, calcium hydroxide, sodium bicarbonate, potassium bicarbonate, aluminum hydroxide and mixtures thereof.

8. The apparatus of claim 1, wherein the inorganic filler is from about 10 weight % to about 90 weight % of the silicone composite.

9. The apparatus of claim 1, wherein the insulation layer has a thickness of less than 2 mm.

10. The apparatus of claim 1, wherein the first metal layer or the second metal layer is made of aluminum or aluminum alloys.

11. The apparatus of claim 1, wherein the silicone composite is capable of forming at least a portion of an inorganic composite at a temperature of no more than 500° C. and maintaining its dimensional stability.

* * * * *